March 20, 1956

H. W. VAN NESS 2,739,215

WELD CURRENT METER AND MONITOR

Filed Oct. 21, 1952

WITNESSES:
E. A. McCloskey.
Leon J. Laya

INVENTOR
Hubert W. Van Ness.
BY
Hymen Diamond.
ATTORNEY

March 20, 1956  H. W. VAN NESS  2,739,215
WELD CURRENT METER AND MONITOR
Filed Oct. 21, 1952  2 Sheets-Sheet 2
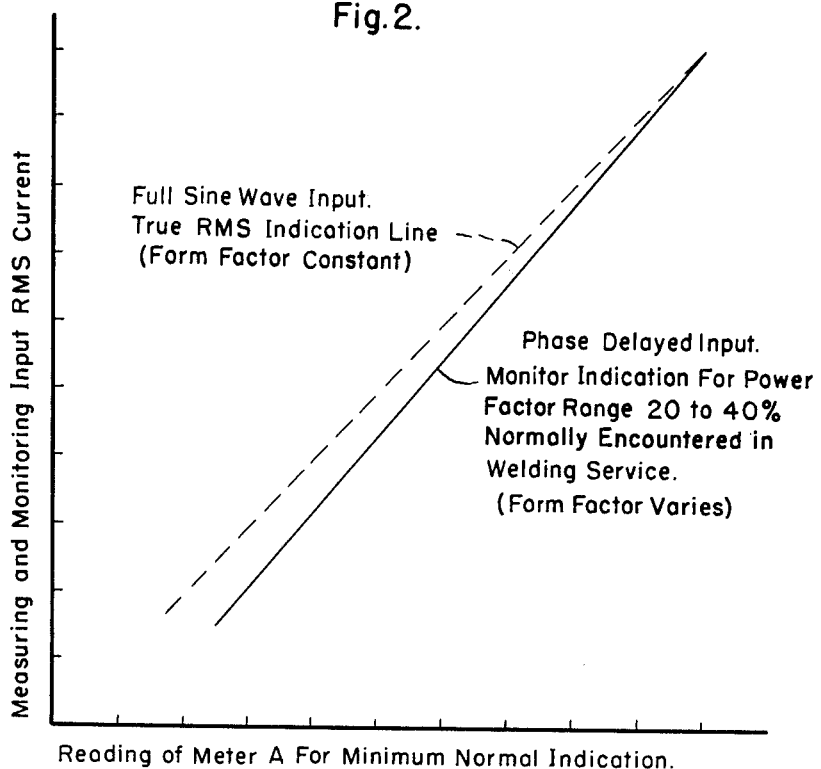
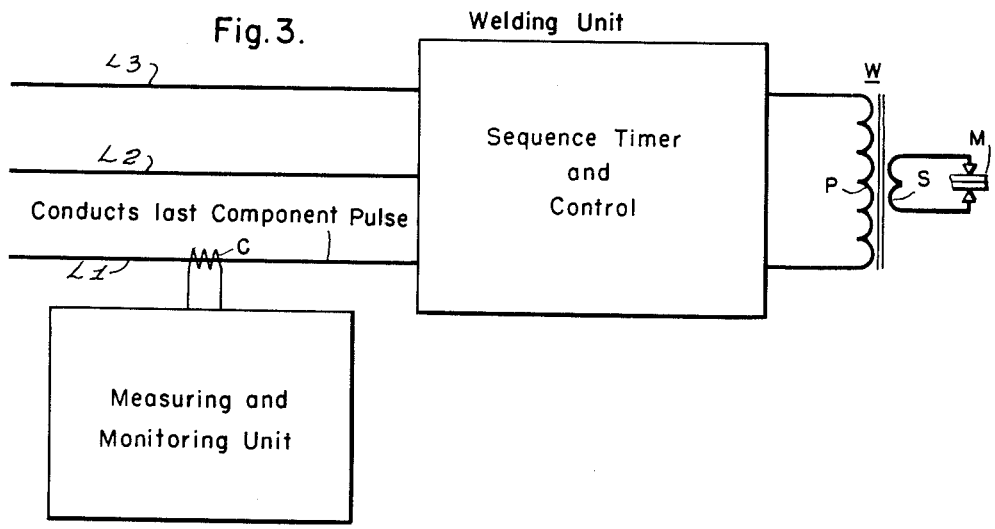
WITNESSES:
INVENTOR
Hubert W. Van Ness.
BY
ATTORNEY

United States Patent Office 2,739,215
Patented Mar. 20, 1956

2,739,215

WELD CURRENT METER AND MONITOR

Hubert W. Van Ness, Buffalo, N. Y., assignor to Westinghouse Electric Corporation, East Pittsburgh, Pa., a corporation of Pennsylvania Application October 21, 1952, Serial No. 315,868

16 Claims. (Cl. 219—4)

My invention relates to electric discharge apparatus and has particular relation to apparatus for measuring and monitoring welding current.

In the fabrication of products of stainless steel, aluminum and like materials, the joints between different parts are, to a large extent, welded. In the welding of such materials as stainless steel and aluminum, the parameters of the welding current must be closely controlled. Welds produced with excessive welding current, or welding current which flows through the material to be welded for an excessively long time interval, are of inferior quality. In the formation of products which require joints of the utmost reliability such as aircraft part, a few such inferior welds result in the scrapping of whole welded assemblies.

To assure that sound welds are uniformly produced, measuring and monitoring apparatus is required, but such apparatus constructed in accordance with the teachings of the prior art, of which I am aware, has not proved entirely adequate. This prior-art apparatus includes provisions for measuring the product of the welding current by the time interval during which it flows. Customarily, a capacitor is charged during the time interval that the welding current flows by current having a magnitude proportional to the magnitude of the welding current and the potential of the capacitor at the end of a weld is determined as a measure of the current-time product. Such apparatus is reasonably satisfactory when the duration of the welding current is relatively long. Where the duration is short, insufficient differences in the electrical signal derived, that is, in the capacitor potential, are manifested for different magnitudes of welding current to yield a reasonably sensitive indication.

It is accordingly an object of my invention to provide sensitive welding current measuring and monitoring apparatus.

Another object of my invention is to provide a weld current meter and monitor particularly suitable for uniformly maintaining the welds produced in metals such as aluminum and stainless steel of a high quality.

Still another object of my invention is to provide welding apparatus including facilities highly sensitive to the magnitude of the welding current for preventing the welding apparatus from operating if the welding current at any point in the operation of the apparatus is outside of a predetermined range.

A still further object of my invention is to provide apparatus for measuring and monitoring the welding current of a welder of the low-frequency type with a measuring and monitoring device calibrated and constructed for a welder of the supply frequency type.

An incidental object of my invention is to provide a novel electronic circuit.

My invention arises from the realization that the variations in the quality of welds are produced predominantly by variations in the magnitude of the welding current rather than by variations in the time during which the welding current flows. This condition arises from the fact that welds of the type involved here are produced with welding apparatus including highly precise timers, the timing operations of which do not vary materially even for substantial variations in the power supply. The magnitude of the welding current, on the other hand, is directly dependent on the magnitude of the power supply voltage and varies with it. A large variation in the power supply thus produces a large variation in the magnitude of the welding current without an accompanying variation in the timing.

In accordance with my invention, I provide metering and monitoring apparatus for welding current which includes a pickup circuit responsive only to the magnitude of the welding current. Such a circuit may be designed to produce substantially different outputs for relatively small differences in the welding current. The apparatus includes a meter which produces indications proportional to the signal received by the pickup circuit. This meter may be calibrated so that the indications correspond to magnitudes of welding current and thus the welding current is measured. When the apparatus operates to monitor the welding current, the output of the pickup device is connected to control the welding apparatus so as to maintain it in operation so long as the welding current lies within a predetermined range, and to stop the operation of the welding apparatus when the welding current is outside of this range.

While my invention may be connected to control welding apparatus of all types, it is particularly suitable to control welders of the non-beat type. Welding apparatus of the non-beat type may be defined as apparatus which includes provisions for assuring that a welding operation will be completed once it is started regardless of whether or not the starting circuit is closed or open.

In accordance with my invention, I provide switch means in the starting circuit of non-beat welding apparatus which maintains this starting circuit open in the quiescent condition of the welder. I further provide means for closing the switch means to permit a welding operation to be started, and means responsive to the magnitude of the resulting welding current for maintaining the switch means closed so long as the welding current lies within a predetermined range. The latter welding-current responsive means is set to become responsive anew during each welding operation before the welding current flows. It is thus capable of monitoring the welding current during each operation.

The novel features that I consider characteristic of my invention are set forth above. My invention itself, however, both as to its organization and its method of operation, together with additional objects and advantages thereof will be understood from the following description of a specific embodiment when read in connection with the accompanying drawings, in which:

Fig. 2 is a graph illustrating the operation of my invention, and

Fig. 3 is a diagram showing a modification of my invention.

DESCRIPTION

Figure 1:
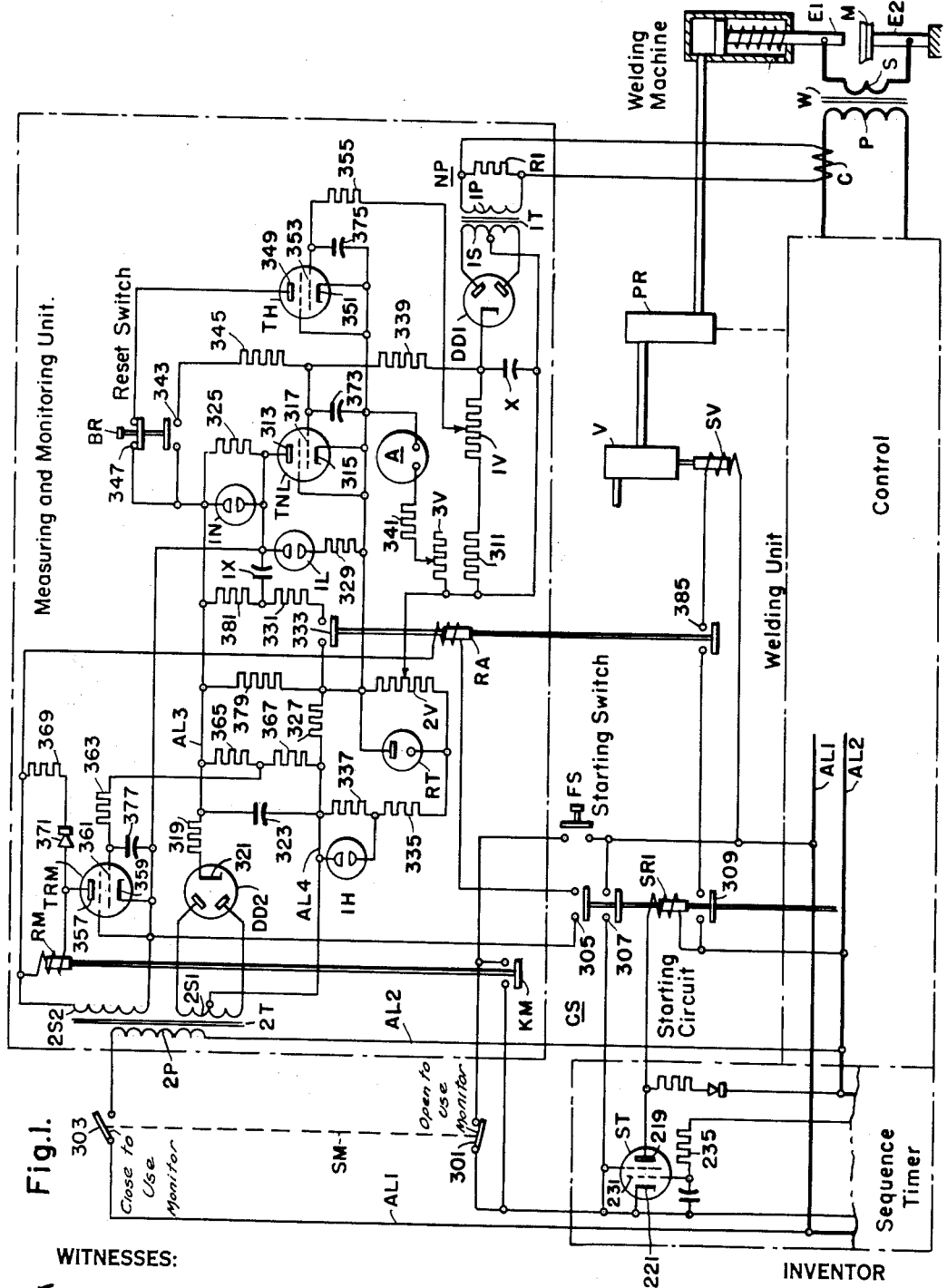
Figure 1 is a circuit diagram of a preferred embodiment of my invention.

Fig. 1 discloses a Welding Unit and a Measuring and Monitoring Unit. The apparatus is supplied with power from the main power supply of the Welding Unit. The Measuring and Monitoring Unit is supplied from auxiliary buses AL1 and AL2 which supply certain of the auxiliary components of the Welding Unit.

The Welding Unit may, on the whole, be of any type known in the art, differing from those known only in the respects in which it is tied up with the Measuring and Monitoring Unit. For the purposes of understanding my invention, the Welding Unit may be regarded as divided into a Sequence Timer, a Control and a Welding Machine. Specifically, my invention is shown as applied to a Welding Unit having a Sequence Timer of the type disclosed in a copending application, Serial No. 272,818, filed February 21, 1952, Clarence B. Stadum, Edward C. Hartwig and me, and assigned to Westinghouse Electric Corporation. The Control and the Welding Machine may be of the three-phase low-frequency type, as shown in said application No. 272,818, or they may be of the single-phase supply frequency type. The difference between the two resides in the specific structure of the Control and Welding Machine and does not concern my invention.

The Welding Unit is of the non-beat type and my invention may be applied with facility in combination with such a Welding Unit. However, my invention is not limited to a non-beat welding apparatus and may be applied to those not including this feature.

The principal components of the Welding Machine are a welding transformer W having a primary P and a secondary S. A pair of welding electrodes E1 and E2 are connected across the secondary S and are urged into engagement with the work M under pressure, controlled by solenoid actuable valve V.

For measuring and monitoring purposes, the welding machine includes a pickup coil C which is coupled to the primary P of the welding transformer W. This coil is in effect a current transformer picking up a potential signal proportional to the magnitude of the current flowing through the primary which may be regarded as the welding current.

The connection of coil C, shown in Fig. 1, is particularly suitable for measuring and monitoring a single phase welder. In carrying out my invention for measuring or monitoring the current of a low-frequency welder, the Measuring and Monitoring Unit ties into the Welding Unit at the sequence timer in the same manner as for a supply frequency welder but the pickup coil C of the Measuring and Monitoring Unit is preferably coupled to that supply bus through which the highest component pulse of the low-frequency pulse is supplied. This is usually the supply bus through which the last component pulse of the low-frequency pulse is supplied. The pickup unit thus picks up an ordinary supply-frequency pulse and need not be of low-frequency construction.

The connection is shown in Fig. 3 which discloses a system including a Welding Unit of the low-frequency type such as is shown in application 272,818. In this system, the coil C is coupled to bus L1 which conducts the last pulse of current conducted during any low frequency period. As shown in Fig. 3 of application 272,818, the last pulse is the pulse conducted between ignitrons I-3 and I-5. In the example illustrated in this Fig. 3 (the graph of 272,818) the cycle of conduction of the ignitrons I-1 through I-6 is repeated three times and ignitrons I-3 and I-5 conduct three component pulses. The second of these pulses is proportional to the highest magnitude reached by the welding current and coil C would produce a signal proportional to it. Thus, in the case illustrated, coil C produces a signal proportional to the amplitude of the low-frequency welding current pulse. The same situation would occur regardless of the number of cycles of conduction of the ignitrons I-1 through I-6 which produce a single welding pulse.

Of course, it is within the scope of my invention to connect the coil C to the primary of the welding transformers of a low-frequency system in the same manner as it is connected in a single phase system. In this case the Measuring and Monitoring Unit should be properly calibrated.

The Sequence Timer includes a number of components usually of the electronic type which are connected to time the various events which take place in succession when a welding operation is being carried out. Usually in producing a weld, the first step is the so-called squeeze step during which the electrodes E1 and E2 are engaged with the work M under pressure. The squeeze interval is followed by a weld interval which starts after sufficient pressure has been applied to the work M and during which welding current flows. The weld interval is followed by a hold interval during which the welding electrodes E1 and E2 are held in engagement with the work until the weld solidifies and then there is an off interval during which the work is reset for another weld. Only the component for timing the squeeze operation is shown in any detail in Fig. 1.

The squeeze component includes a squeeze thyratron ST having an anode 219, a cathode 221 and a control electrode 231. The squeeze thyratron ST is connected in starting circuit CS which may be closed to start a welding operation. In the quiescent state of the apparatus, the starting circuit is maintained open by a contact or switch means KM actuable by a monitoring relay RM. The starting circuit CS extends from bus AL2 through the exciting coil of a starting relay SR1, the anode 219 and cathode 221 of the squeeze thyratron ST, the normally open contact KM, the normally open starting switch FS for the Welding Unit to bus AL1. It is to be noted that to start a welding operation, both the contact KM and the switch FS must be closed. In situations in which the monitoring function of the Measuring and Monitoring Unit is not desired, the contact KM may be shunted out by contact 301 of a manual switch SM. The switch SM has another contact 303 in series with the primary 2P of the transformer 2T from which the Measuring and Monitoring Unit is supplied, the latter being open when contact 301 is closed and being closed when contact 301 is open.

The starting relay SR1 has three normally open contacts 305, 307 and 309. One of these, 305, is connected to advance the operation of the Measuring and Monitoring Unit; another, 309, is connected to advance the operation of the welder and a third is connected to shunt out the starting switch FS and the contact KM. The latter produces the non-beat operation of the apparatus since once it is closed, it maintains the starting circuit CS closed so long as the squeeze thyratron ST conducts, thus permitting the welding operation started to be completed. Naturally, where my invention is applied in combination with a welder not having the non-beat feature, a contact analogous to 307 may be provided on a suitable energized relay of the apparatus. In effect then, the welding apparatus, in a combination of the last-described type, becomes non-beat apparatus.

The Control determines the magnitude and the duration of the flow of current through the primary P and, therefore, of the flow of welding current. This Control is actuated, and the duration of its operation is controlled, by the weld component of the Sequence Timer which times the interval during which welding current flows. The operation of the control is stopped by the hold component and once stopped it is not again started until the succeeding weld interval. The operation of the weld component is the same whether it is of the single-phase supply frequency type or of the type disclosed in detail in the above-cited application.

The Measuring and Monitoring Unit includes a signal pickup network NP consisting of a transformer 1T having a primary 1P and a secondary 1S. Across the primary, a resistor R1 is connected. I have found that by properly dimensioning the resistor and the impedance of the transformer, a signal of substantial magnitude may be derived at the secondary 1S of the transformer when current flows through the primary 1P of the welding transformer.

The secondary 1S of the transformer 1T is connected in a full-wave rectifier circuit with a double diode DD1 across a capacitor X. When current flows through the primary P, this capacitor receives a charge proportional to the magnitude of the current flow. Across the capacitor X a voltage divider 1V is connected in series with a resistor 311. The divider 1V determines the range of operation of the Measuring and Monitoring Unit and may be called the range divider.

The potential impressed across the capacitor X controls a pair of thyratrons. One of these thyratrons TNL in its operation distinguishes between normal or correct welding current and low-welding current, and the other thyratron TH operates when the current is excessively high.

The thyratron TNL has an anode 313, a cathode 315 and a control electrode 317. This thyratron is supplied from direct-current buses AL3 and AL4 which are energized from the secondary 2S1 of the transformer 2T, through a full-wave rectifier including a double diode DD2 and through a filtering circuit consisting of a resistor 319 in series with a cathode 321 of the diode DD2 and a capacitor 323 shunted across the buses AL3 and AL4. The positive bus AL3 is connected to the anode 313 through an anode resistor 325. The negative bus is connected to the cathode through another resistor 327. An indicator IN in the form of a glow tube is connected across the anode resistor 325. When this glow tube is energized, it indicates that the current flowing through the welding transformer is normal, that is, is within the desired range. A second indicator IL in the form of another glow tube is connected in parallel with the anode 313 and cathode 315 through a current limiting resistor 329. When the flow tube IL is energized, it indicates that the current flowing through the welding transformer is below the desired range.

A capacitor 1X is adapted to be connected across the anode 313 and the cathode 315 through another resistor 331 and through a normally open contact 333 of an auxiliary relay RA. Biasing potential for the thyratron TNL is derived from a voltage divider 2V which is supplied with potential derived from the buses AL3 and AL4. The voltage divider 2V is connected across the cathode resistor 327 through a pair of additional resistors 335 and 337 and is shunted by a regulator tube RT which maintains its voltage substantially constant. One terminal of the divider 2V is thus connected to the cathode 315; the adjustable tap of the divider is connected to the control electrode 317 through the resistor 311, the divider 1V and a grid resistor 339. The voltage derived across divider 1V from the capacitor X and a portion of the voltage of the voltage divider 2V are thus connected in series between the control electrode and the cathode of the thyratron TNL. The voltage divider 2V is so connected to the control electrode 317 that it impresses a negative potential between the control electrode 317 and the cathode 315 which may be counteracted by the potential from the capacitor X impressed across the resistor 311 and the divider IV. The voltage divider 2V may be set to determine for what charge on the capacitor X the thyratron TNL conducts and thus to determine the lower limit of the desired welding current range.

A meter A is connected across the biasing section of the voltage divider 2V through a variable resistor 3V and a fixed resistor 341. The variable resistor 3V functions to set the meter to read in a predetermined manner for a predetermined current produced in the signal pickup network NP. For a single-phase supply-frequency welder, the meter is preferably set to produce a full scale reading for a signal current equal to 5 amperes.

The control electrode 317 is also adapted to be connected to the anode 313 (through the anode resistor 325) through a normally open contact 343 of an instantaneous switch or push button BR which may be called the reset switch, and through a current limiting resistor 345. The reset switch also has a normally closed contact 347.

The thyratron TH has an anode 349, a cathode 351 and a control electrode 353. The anode 349 is connected to the positive bus AL3 through the normally closed contact 347 of the reset switch BR; the cathode 351 is connected to the negative bus AL4 through the cathode resistor 327. The anode 349 and the cathode 351 of thyratron TH thus, in effect, shunt thyratron TNL and its anode resistor 325 through closed contact 347. Current flow between the anode 349 and the cathode 351 of the thyratron TH also causes current to flow through the resistor 327 which, in turn, causes increased current to flow through the voltage divider 2V and the resistors 335 and 337 in series with it. One of these resistors 337 is shunted by a glow tube IH which is energized when thyratron TH conducts and increased current flows through the resistors 327 in series with it. This glow tube IH indicates that the welding current is excessively high. The control electrode 353 of thyratron TH is connected through a grid resistor 355 to the adjustable tap of the voltage divider 1V. The adjustable tap of divider 1V may be set to determine for what charge on capacitor X thyratron TH just becomes conductive. Thyratrons TH and TNL have similar characteristics. Since the control electrode 317 of thyratron TNL is at the potential of the positive plate of the capacitor X and control electrode 353 of thyratron TH is at a less positive potential (unless the divider 1V is set with its tap at the right-hand terminal) thyratron TH becomes conductive for a higher potential on capacitor X and therefore for higher welding current than thyratron TNL. Divider 1V which determines the extent of this difference may thus be set to correspond to the permissible range of welding current.

The relay RM is controlled by still a third thyratron TRM. This thyratron has an anode 357, a cathode 359 and a control electrode 361. The anode 357 and cathode 359 are connected through the coil of the relay RM across a secondary 2S2 of transformer 2T. The control electrode 361 is connected through a grid resistor 363 to the junction of a pair of resistors 365 and 367 across buses AL3 and AL4. The cathode 359 is connected to the anode 313 of thyratron TNL. It is seen that with the thyratron TNL non-conductive, the cathode of thyratron TRM is substantially at the potential of positive bus AL3, a negative bias is impressed on the control electrode 361 of thyratron TRM and the latter is non-conductive. When thyratron TNL conducts, the cathode 359 of thyratron TRM is connected to the negative bus AL4 through the small drop across resistor 327 and the control electrode 361 of the thyratron TRM is biased positive so that thyratron TRM may conduct.

The coil of relay RM is shunted by a resistor 369 in series with a rectifier 371 which maintain the current flow through the coil during the intervals when the anode-cathode potential of thyratron TRM is negative and the latter is non-conductive. The Measuring and Monitoring Unit also includes the relay RA, the coil of which is supplied from the secondary 2S2 through contact 305 of relay SR1.

I have found that a system in which the components have the following magnitudes, operates satisfactorily:

| | |
|---|---|
| Signal pickup resistor R1 | 1 ohm. |
| Transformer 1T | 5 volts across primary; produces 80 volts across each half of the secondary. |
| Composite impedance of transformer 1T and resistor R1 | .684 ohm. |
| Double diodes DD1, DD2 | 6x5. |
| Capacitor X | .5 microfarad. |
| Divider 1V | 25,000 ohms. |
| Resistor 311 in series with divider 1V | 47,000 ohms. |
| Thyratrons TNL, TH, TRM | WL 2050. |
| Grid resistors 339, 355, 363 | 100,000 ohms. |
| Surge suppressing capacitors 373, 375, 377 | .0022 microfarad. |
| Voltage divider 2V | 50,000 ohms. |
| Regulator RT | VR 105. |
| Voltage divider 3V | 50,000 ohms. |
| Resistor 341 in series with 3V | 68,000 ohms. |
| Anode resistor 325 | 15,000 ohms. |
| Capacitor 1X | 1/10 microfarad. |
| Resistor 331 in series with 1X | 15,000 ohms. |

| | |
|---|---|
| Discharging resistor 331 for 1X | 6,800 ohms. |
| Resistor 379 between AL3 and AL4 | 10,000 ohms. |
| Resistor 327 at bus AL4 | 10,000 ohms. |
| Resistor 345 connected to reset switch | 100,000 ohms. |
| Glow tubes IN, IL, IH | NE 57. |
| Resistor 337 across high lamp | 3,000 ohms. |
| Resistor 335 in series with high lamp | 2,000 ohms. |
| Resistor 365 between grid TRM and bus AL3. | 22,000 ohms. |
| Resistor 367 between grid TRM and bus AL4. | 68,000 ohms. |
| Filter capacitor 323 | 2 microfarads. |
| Filter resistor 319 | 300 ohms. |
| Potential between AL1 and AL2 | 115 volts. |
| Resistor 369 across coil RM | 680 ohms. |
| Resistor 381 across capacitor IX and IN | 15,000 ohms. |
| Current limiting resistor 329 | 33,000 ohms. |

*Standby condition*

In the standby condition, the circuit breakers of the Welding Unit are closed and the switch SM is positioned so that contact 303 in series with the primary 2P is closed and contact 301 open. The heaters of the cathodes of the various thyratrons ST, TNL, TH, TRM and rectifiers DD1, DD2 are then heated to the proper temperature. Thyratrons TNL, TH and TRM are deenergized and relay RM is deenergized. Thyratron ST is deenergized and relays SR1 and RA are deenergized as is also the solenoid SV for the valve V. Under these circumstances, sufficient voltage is impressed across glow tube IL so that the latter is energized. Tubes IN and IH are deenergized because thyratrons TNL and TH are non-conductive.

*Calibration—for measuring*

The Measuring and Monitoring Unit is calibrated in the standby condition. I have found that in many situations the current flowing through the signal pickup network NP for the maximum welding current magnitude may conveniently be 5 amperes R. M. S. This current is readily obtained with the composite resistance of .684 ohm across the primary P of the transformer 1T.

In calibrating the Measuring and Monitoring Unit, 5 amperes R. M. S. current having a sine wave form is supplied directly to the network NP. If the unit is to be used with a Welding Unit of the single-phase supply-frequency type, this current may conveniently be derived from the supply. The current flow produces a charge on capacitor X which may be counteracted by a setting of the voltage divider 2V. The voltage divider 2V is then set to a point at which thyratron TNL just becomes conductive; this is indicated by the extinction of low tube IL and the enrgization of tube IN. The system is now set so that for current flow through the primary P which would produce five amperes in the signal pickup network NP, the indication of the Measuring and Monitoring Unit would be normal. The variable resistor 3V is now adjusted so that the meter A produces a full scale deflection for the 5 ampere current flow through the pickup network.

Less-than-full-scale indications of meter A correspond to proportionately lower welding currents. The proportionality relationship is exact only if the lower welding currents to which the lower readings of meter A are of sinusoidal wave form. Where the lower welding current is produced by lower heat control settings of the control, the wave form is not sinusoidal and the precise current magnitudes may be derived from a calibration curve such as is shown in Fig. 2. This Fig. 2 curve is the calibration curve for the combination including a single-phase supply-frequency Welding Unit.

In this curve, the current supplied to the signal pickup network NP for any welding current is plotted vertically and the corresponding reading of meter A is plotted horizontally. The broken straight line is a graph of the current in the signal pickup network NP as a function of the meter reading for the situation in which the current flow through the primary P is sinusoidal, that is, the heat control settings are such that the discharge devices in the control which supply the primary P are fired at angles in the supply potential which corresponds to the power factor of the welding apparatus. The full line is a graph of the current input to the signal pickup network NP as a function of the meter readings for situations in which the heat control settings are such that the discharge devices of the control are fired later in the periods of the supply than that corresponding to the power factor.

The full line graph was derived by actual measurement of the welding current, by means of oscillographs, for the different readings of the meter A. It is reasonably accurate for a power factor range of from 20 to 70 percent.

*Calibration and setting for monitoring*

The setting of divider 2V which determines for what voltage on capacitor X thyratron TNL just becomes conductive determines the lower boundary of the welding current range, that is, the minimum welding current of the permissible range. The divider 1V is set to determine at what voltage of capacitor X thyratron TH just becomes conductive and determines the upper limit of the permissible welding current.

In practice, the range divider 1V is usually provided with scale markings which indicate, in percent, the ratio between the range and the minimum permissible current. The scale of divider 1V must then be calibrated. This calibration may be effected with the aid of divider 2V and meter A. The divider 2V may be first set to correspond to an intermediate magnitude, say 3 amperes, and the divider 1V at its first scale reading. Current of this magnitude may then be transmitted through pickup network NP. The current through network NP may then be increased until thyratron TH just becomes conductive. Thyratron TNL is then rendered non-conductive. Thyratron TH may then be disconnected by removing its anode connection for example and divider 2V reset so that tehyratron TNL again just becomes conductive. The reading of meter A gives the current flowing through the network NP and from the current the percent of the minimum current to which the first scale marking corresponds may be calculated. The same process may be repeated for the other scale markings.

To set the Measuring and Monitoring Unit for monitoring the permissible maximum and minimum current is determined by welding a few samples. The divider 2V is then set, with the aid of meter A, to correspond to the minimum permissible current and the divider 1V to the maximum permissible current.

*Operation.—Measuring*

After it has been calibrated as described, the apparatus may be used to measure the magnitude of the welding current and to monitor the operation of the Welding Unit. The measurement of the welding current is effected with meter A. In monitoring, the Measuring and Monitoring Unit locks out the Welding Unit if the current is of improper magnitude.

In operation, the switch SM is positioned so that contact 303 is closed and contact 301 open, welding material is disposed between the welding electrodes and the control is set so that the desired welding current is produced. The starting switch FS is then closed and welding operations are carried out. To measure the magnitude of the welding current, the divider 2V is so set that thyratron TNL just becomes conductive. The conduction of the thyratron TNL is manifested by the extinction of the low lamp IL and the energization of the normal lamp IN. The reading of the meter A is now observed for the setting of the divider 2V. This reading, if necessary, with the aid of Fig. 2, determines the welding current.

To determine the actual current flow from any meter reading in a practical case, the full line graph of Fig. 2 is used, since the current is reduced by a reduced heat control setting. For any meter reading, the corresponding input current to the signal pickup network NP is determined from the full line graph and the actual primary current or welding current may be calculated knowing the transformer ratio of the coil C and of the welding transformer. Thus, for a meter reading of 0.5, the input to the signal pickup network NP as derived from the full line graph is of the order of 2.2 amperes. To determine the current flowing through the primary P, the ratio of 2.2 to 5 (the 5 corresponding to the full deflection of meter A) is multiplied by the current ratio of the transformer including coil C. Thus, if this ratio is 400, the primary current is $$\frac{2.2}{5} \cdot 400 = 176 \text{ amperes R. M. S.}$$

*Operation.—Monitoring*

When the apparatus is to monitor a Welding Unit, which is to supply a current within a predetermined range, the divider 2V may be set to correspond to the minimum of the range and divider 1V to the maximum. To provide the desired range, the divider 1V is adjusted to the point corresponding to the percentage of the minimum current over which the range is to extend. When this minimum range is exceeded, the thyratron TH becomes conductive.

With the apparatus so set, the switch SM is actuated as explained above. Since current is not initially flowing through the primary P, the divider 2V maintains the thyratron TNL non-conductive and the low lamp IL is energized. Thyratrons TH, TRM and ST are also non-conductive.

Preliminary to starting a welding operation, the reset switch BR is actuated momentarily connecting the control electrode 317 of the thyratron TNL to its anode 313. The thyratron TNL becomes conductive and remains conductive since it is supplied from the direct-current buses AL3 and AL4. This event is indicated by the extinction of the low tube IL and the energization of the normal tube IN. By the potential drop available across glow tube IN, the capacitor 1X is charged with its right-hand plate positive and its left-hand plate negative. The reset switch BR is returned to its initial position after it is actuated but this does not effect the operation of the thyratron TNL.

The conduction of the thyratron TNL, in effect, causes the cathode 359 of the thyratron TRM to be connected to the negative bus AL4, and thyratron TRM is rendered conductive, and remains conductive. Relay RM is now energized closing contact KM and conditioning the Welding Unit for a welding operation.

A welding operation may now be started by the closing of the starting switch FS. The anode-cathode circuit of the squeeze thyratron ST is now closed and the thyratron conducts, actuating the relay SR1. At one of its now closed contacts 307, the relay SR1 locks the thyratron ST into conductive condition thus assuring that a complete welding operation will be carried out. At another now closed contact 305, a circuit is closed supplying current from the secondary 2S2 through the coil of the auxiliary relay RA. The relay RA picks up and at its now closed contact 385 closes a circuit, through the now closed contact 309 of the starting relay SR1, through the solenoid SV. Pressure is now supplied to cause the movable electrode E1 to engage the work.

At another now closed contact 333 of relay RA, a circuit is completed connecting charged capacitor 1X between the negative bus AL4 and the anode 313 of the thyratron TNL. The capacitor produces a surge through the thyratron TNL rendering it non-conductive. The low tube IL is now reenergized and the normal tube IN deenergized. Thyratron TRM then also becomes non-conductive and relay RM drops out, opening contact KM. However, the system remains locked in through the now closed contact 307 of relay SR1 and the operation of the welding cycle which was started continues.

After the electrode E1 engages the work M and adequate pressure is applied, the squeeze component of the sequence timer times out and the timing of the weld component starts. Welding current now flows through the primary P of the welding transformer W and the capacitor X is charged through the coil C and the signal pickup network NP. If the welding current is within the desired range, the thyratron TNL is now rendered conductive. The low tube IL is then extinguished and the normal tube IN energized to indicate that normal welding current is flowing. Thyratron TRM is then again energized and relay RM picks up closing contact KM so that further welding operations may be carried out. The starting switch FS may then be maintained closed or repeatedly closed and the welding operation continues so long as the welding current is of the proper magnitude.

It is to be noted that during each welding operation the squeeze thyratron ST is rendered non-conductive during the off interval. Relay SR1 and relay RA are then deenergized. When, at the beginning of a succeeding welding operation, thyratron ST is reenergized, relay SR1 and RA are reclosed and capacitor 1X, which had been charged while relay RA was deenergized, causes thyratron TNL to be rendered non-conductive through contact 333 and thus resets it to test the current magnitude during this new welding operation. At the same time, thyratron TRM and relay RM are also deenergized.

Let us assume now that the welding current has dropped below the desired range during one welding cycle of a series being monitored. Under such circumstances, the thyratron TNL remains non-conductive when it is rendered non-conductive by the reclosing of contact 333. Low tube IL remains energized and the normal tube IN deenergized. Thyratron TRM also remains non-conductive and contact KM open. The Welding Unit is now prevented from operating to produce a succeeding weld because the starting circuit is open at the contact KM. To start another operation, the reset switch BR must be again closed to condition the Welding Unit for operation.

Let us assume that during one welding cycle of a series of welds the welding current becomes too high. Under such circumstances, the thyratron TH is rendered conductive. Since this thyratron is connected across the thyratron TNL, the latter is maintained non-conductive. The cathode 351 of this thyratron TH is connected to the negative bus AL4 through the resistor 327 and the anode directly to the positive bus AL3. The potential of the direct-current source AL3—AL4 thus, in effect, appears as the potential drop across resistor 327. The cathode 359 of thyratron TRM is thus connected through the thyratron TH to the positive terminal of resistor 327 and is thus positive relative to the control electrode 361. Thyratron TRM and relay RM are non-conductive and the Welding Unit is locked out. Thyratron TH is also connected across the normal and low tubes IN and IL and when it is conductive, it reduces the potential across these tubes to so low a magnitude that neither of the tubes becomes energized. Because of the increased current flow through resistor 327, the drop across resistor 337 is high and the high tube IH is energized, and indicates that the welding current is high.

The apparatus may again be reset by actuating the reset switch BR. This time the thyratron TH is rendered non-conductive at the now open contact 347 of the reset switch and the thyratron TNL is rendered conductive at the now closed contact of the reset switch. The above-described operation is then repeated.

*Conclusion*

The apparatus disclosed herein is a Measuring and Monitoring Unit which responds only to the magnitude of the welding current and is, therefore, reasonably precise. The time duration of the welding current is set by a timer such as is included in the welding unit and is in any event precise. With the apparatus highly uniform, welds of high quality may be produced.

While I have shown and described a specific embodiment of my invention, many modifications thereof are feasible. My invention, therefore, is not to be restricted except insofar as is necessitated by the spirit thereof.

I claim as my invention:

1. Apparatus for monitoring the operation of a welding system comprising in combination means adapted to be connected to said welding system and adapted to prevent said system from performing a welding operation unless said means is actuated and to condition said system to perform a welding operation when actuated; means responsive to the magnitude of the welding current conducted during said welding operation for actuating said means adapted to be connected, to maintain said system conditioned as aforesaid for succeeding welding operations if the magnitude of said welding current lies within a predetermined range and to prevent said means adapted to be connected, from conditioning said system to perform a succeeding welding operation if said magnitude is outside of said range, and means responsive to said system after it has been conditioned prior to each welding cycle and while said welding cycle is in progress but before welding current flows during said cycle for setting said magnitude responsive means to respond as aforesaid during said welding cycle.

2. Apparatus according to claim 1, characterized in that the responsive means includes means for locking out the means adapted to be connected to the welding system, when said means adapted to be connected is once prevented from being actuated by the magnitude responsive means, and also includes means for resetting said means adapted to be connected for a succeeding operation after said last named means has been locked out as aforesaid.

3. Apparatus for monitoring the operation of a welding system of the non-beat type and including a starting circuit for starting the operation of said welding system comprising in combination switch means for maintaining said starting circuit open in the quiescent condition of said apparatus, means for actuating said switch means to permit said circuit to be closed, means responsive to the magnitude of the welding current which flows during a welding operation succeeding the actuation of said switch means for maintaining said switch means actuated as aforesaid if said welding current lies within a predetermined range and for causing said switch means to open said starting circuit if the magnitude of said welding current lies outside of said range, and means responsive to said welding system after said switch means has been actuated prior to each welding cycle and while said welding cycle is in progress but before welding current flows for setting said magnitude responsive means to respond as aforesaid to the magnitude of the welding current which flows during said cycle.

4. Apparatus for monitoring the operation of a welding system of the type having a non-beat control unit and including a starting circuit for starting the operation of said system comprising in combination, switch means adapted to maintain said starting circuit open in the quiescent condition of said apparatus, a thyratron having an anode, a cathode and a control electrode, means connecting said anode and cathode of said thyratron in circuit with said switch means to actuate said switch means when said thyratron becomes conductive, means connected to the control electrode of said thyratron to maintain said thyratron non-conductive in the quiescent condition of said apparatus, means connected to said control electrode and operable independently of said welding circuit for rendering said thyratron conductive to actuate said switch means to close said starting circuit and permit said system to perform a welding operation, means responsive to said system while it is performing a welding operation during each welding cycle but before welding current flows for rendering said thyratron non-conductive, and means responsive to the magnitude of the welding current during said cycle connected to the control electrode of said thyratron for again rendering said thyratron conductive if said welding current lies within a predetermined range.

5. Apparatus for monitoring the operation of a welding system of the type having a non-beat control unit and including a starting circuit for starting a welding operation comprising in combination switch means in said starting circuit for maintaining said starting circuit open in the quiescent condition of said apparatus, a first thyratron having an anode, a cathode and a control electrode, means connected in circuit with said anode and cathode for actuating said switch means to close said circuit and permit said welding system to perform a welding operation when said thyratron is rendered conductive, means connected to said control electrode for maintaining said thyratron non-conductive in the quiescent condition of said apparatus, a second thyratron having an anode, a cathode and a control electrode, means connecting said anode and cathode of said second thyratron in circuit with the control electrode of said first thyratron for rendering said first thyratron conductive when said second thyratron is rendered conductive, means to be momentarily actuated and thereafter reverted to its initial condition connected to the control electrode of said second thyratron for rendering said second thyratron conductive when it is so actuated, means responsive to said welding system after said switch means has been actuated prior to each welding cycle and while the welding operation is in progress during said cycle but before welding current flows for rendering said second thyratron non-conductive after it has been rendered conductive as aforesaid, means connected to the control electrode of said second thyratron and responsive to the magnitude of the welding current during said cycle for rendering said second thyratron again conductive only if said welding current lies above a predetermined range, a third thyratron having an anode, a cathode and a control electrode, means for connecting said anode and cathode of said third thyratron in circuit with the control electrode of said first thyratron to render said first thyratron non-conductive if said third thyratron is conductive, and means responsive to the magnitude of the welding current during said cycle and connected to the control electrode of said third thyratron for rendering said third thyratron conductive if said welding current exceeds a predetermined range.

6. Apparatus according to claim 5, characterized by the fact that the means to be momentarily actuated is a manual switch having a normally closed contact in circuit with the anode and cathode of the third thyratron, and a normally open contact between the control electrode and the anode of the second thyratron.

7. Apparatus according to claim 5, characterized by the fact that the anode and cathode of the third thyratron is connected across the anode and cathode of the second thyratron, whereby the second thyratron is rendered non-conductive when the third thyratron is rendered conductive.

8. Apparatus according to claim 7, characterized by first indicating means in circuit with the anode and cathode of the second thyratron adapted to indicate conduction of said second thyratron, second indicating means in parallel with the anode and cathode of said second thyratron adapted to indicate that said second thyratron is non-conductive, and third indicating means in circuit with the anode and cathode of the third thyratron adapted to indicate that said third thyratron is conductive.

9. In combination, a first thyratron having an anode, a cathode and a control electrode, means for impressing a potential between the anode and the cathode, means for impressing a blocking potential between the control electrode and the cathode, a manually actuable switch having a normally closed and a normally open contact, means connecting the normally open contact between said anode and said control electrode, a second thyratron having an anode, a cathode and a control electrode, means for connecting said anode of said second thyratron to said anode of said first thyratron through said normally closed contact, means for connecting said cathode of said first thyratron to said cathode of said second thyratron, means for impressing a blocking potential between the control electrode and the cathode of said second thyratron, said last-named blocking potential being greater than the blocking potential impressed between said control electrode and cathode of said first thyratron, and means common to both said blocking potential impressing means for impressing a potential tending to counteract said blocking potential.

10. In combination, a first thyratron having an anode, a cathode and a control electrode, means for impressing a potential between said anode and said cathode, first biasing means for impressing a first blocking potential between said control electrode and said cathode, a manually actuable switch having a normally closed and a normally open contact, means for connecting said normally open contact between said anode and said control electrode, a second thyratron having an anode, a cathode and a control electrode, means including said normally closed contact for connecting said anode and cathode of said second thyratron in parallel with said anode and cathode of said first thyratron, second biasing means for impressing a second blocking potential between the control electrode and said cathode of said second thyratron, said second blocking potential being greater than said first blocking potential, and means common to said first and second biasing means for impressing a potential tending to counteract said blocking potentials.

11. The combination according to claim 10, characterized by first indicating means in series with the anode and cathode of said first thyratron, second indicating means in parallel with the anode and cathode of said first thyratron, and third indicating means in series with the anode and cathode of said second thyratron.

12. Apparatus according to claim 10, characterized by the fact that the means for impressing a potential between the anode and cathode of the first thyratron is of the direct-current type.

13. In combination electric welding apparatus including a starting circuit adapted to be closed to start the operation of said apparatus; normally open switch means in said starting circuit to prevent the starting of said welding apparatus in the quiescent condition of said apparatus, means for actuating said switch means to close said switch means and permit said starting circuit to start a cycle of said welding apparatus; means responsive to the starting of said welding cycle by said apparatus to maintain said apparatus in operation independently of said switch means until said welding cycle has been completed; means to be conditioned to respond to the magnitude of the welding current flowing during said welding cycle for maintaining said switch means actuated to maintain said starting circuit closed if the magnitude of said welding current lies within a predetermined range and to open said switch means and said starting circuit if said magnitude lies outside of said range; and means responsive to the starting of said welding cycle and actuable before the flow of welding current starts to condition said welding-current responsive means to respond as aforesaid.

14. In combination a first thyratron having an anode, a cathode and a control electrode; a second thyratron having an anode, a cathode and a control electrode; impedance means connected in circuit with the anode and cathode of the first thyratron; a switch having normally closed and normally open contacts, means including said normally open contacts for connecting said control electrode of said first thyratron to said anode of said first thyratron, and means including said normally closed contacts for connecting the anode and cathode of said second thyratron across the circuit including said impedance and the anode and cathode of the first thyratron.

15. In combination a first thyratron having an anode, a cathode and a control electrode; a second thyratron having an anode, a cathode and a control electrode; a positive bus and a negative bus between which direct-current potential is to be supplied; means for deriving a potential intermediate the potentials of said positive and negative buses; means for impressing said derived potential on the control electrode of said first thyratron; means for connecting the cathode of said first thyratron to the anode of said second thyratron; an impedance connected between the anode of said second thyratron and said positive bus; means for connecting the cathode of said second thyratron to said negative bus; a third thyratron having an anode, a cathode and a control electrode; means for directly connecting the anode of said third thyratron to said positive bus; means connecting the cathode of said third thyratron to the cathode of said second thyratron; and means for impressing biasing potentials of different magnitudes on the control electrodes of said second and third thyratrons.

16. In combination a plurality of supply conductors adapted to supply alternating-current power; a welder including a control adapted to build up successive individual component pulses from said conductors into a single pulse of one polarity and of duration substantially longer than a half period of said alternating-current power, said control deriving said pulses from said conductors in a predetermined succession, a measuring and monitoring unit having a pick-up coil and means for coupling said coil to that one of said conductors which supplies the component pulse at which said single pulse reaches its maximum polarity.

References Cited in the file of this patent

UNITED STATES PATENTS

| | | |
|---|---|---|
| 2,264,067 | Chambers | Nov. 25, 1941 |
| 2,370,009 | Clark et al. | Feb. 20, 1945 |
| 2,440,962 | Livingston | May 4, 1948 |
| 2,473,238 | Bivens | June 14, 1949 |
| 2,474,867 | Sciaky | July 5, 1949 |
| 2,482,892 | Barwick | Sept. 27, 1949 |
| 2,577,411 | Faulk | Dec. 4, 1951 |
| 2,600,941 | Undy | June 17, 1952 |